United States Patent [19]

Shiba et al.

[11] Patent Number: 4,977,475

[45] Date of Patent: Dec. 11, 1990

[54] LINING MEMBER FOR THE SURFACE OF A CASING FOR A DISC CARTRIDGE

[75] Inventors: Haruo Shiba; Masaru Ikebe, both of Komoro, Japan

[73] Assignee: TDK Corporation, Tokyo, Japan

[21] Appl. No.: 327,615

[22] Filed: Mar. 23, 1989

[30] Foreign Application Priority Data

Mar. 31, 1988 [JP] Japan .............................. 63-43888[U]

[51] Int. Cl.$^5$ .............................................. G11B 23/03
[52] U.S. Cl. ................................ 360/133; 360/130.34; 206/313; 206/444
[58] Field of Search ............... 360/133, 128, 132, 137, 360/130.34, 97; 428/900; 206/312, 313, 444

[56] References Cited

U.S. PATENT DOCUMENTS

| | | | |
|---|---|---|---|
| 4,053,935 | 10/1977 | Shiba et al. | 360/132 |
| 4,165,051 | 8/1979 | Shiba et al. | 242/74.1 |
| 4,168,043 | 9/1979 | Shiba | 242/199 |
| 4,181,272 | 1/1980 | Shiba et al. | 242/74.1 |
| 4,212,437 | 7/1980 | Shiba et al. | 242/199 |
| 4,380,030 | 4/1983 | Shiba et al. | 360/132 |
| 4,382,562 | 5/1983 | Shiba | 242/199 |
| 4,385,734 | 5/1983 | Shiba | 242/68.5 |
| 4,466,582 | 8/1984 | Shiba | 242/199 |
| 4,515,322 | 5/1985 | Shiba et al. | 242/7.18 |
| 4,545,483 | 10/1985 | Shiba et al. | 360/132 |
| 4,558,387 | 12/1985 | Shiba et al. | 360/132 |
| 4,586,606 | 5/1986 | Howey | 206/313 |
| 4,610,352 | 9/1986 | Howey et al. | 206/313 |
| 4,648,002 | 3/1987 | Mroz et al. | 360/133 |
| 4,688,128 | 8/1987 | Shiba et al. | 360/132 |
| 4,707,757 | 11/1987 | Shiba et al. | 360/132 |
| 4,709,816 | 12/1987 | Matsumoto et al. | 360/133 |
| 4,796,137 | 1/1989 | Gruehn et al. | 206/313 |
| 4,812,938 | 3/1989 | Rogers et al. | 360/133 X |

FOREIGN PATENT DOCUMENTS

| | | | |
|---|---|---|---|
| 54-9916 | 1/1979 | Japan | 360/128 |
| 57-86171 | 5/1982 | Japan | 360/133 |
| 59-203283 | 11/1984 | Japan | 360/133 |
| 60-20374 | 2/1985 | Japan | 360/133 |
| 60-83281 | 5/1985 | Japan | 360/133 |
| 61-258057 | 11/1986 | Japan . | |
| 63-36971 | 3/1988 | Japan . | |
| 63-152075 | 6/1988 | Japan | 360/133 |

Primary Examiner—John H. Wolff
Assistant Examiner—Alfonso Garcia
Attorney, Agent, or Firm—Oblon, Spivak, McClelland, Maier & Neustadt

[57] ABSTRACT

A disk cartridge includes upper and lower half casings to be assembled to form a hard casing, a magnetic disk held in the casing in a rotatable manner and lining members attached to the inner surfaces of the upper and lower half casings, wherein the lining member has a laminated structure which includes an attracting layer as a base layer for attracting dust and a smooth layer having a large number of apertures which is laminated on at least one surface of the base layer.

5 Claims, 3 Drawing Sheets

LINING MEMBER FOR THE SURFACE OF A CASING FOR A DISC CARTRIDGE

BACKGROUND OF THE INVENTION

1. Field of the Invention

The present invention relates to a disk cartridge used as a container for a disk-like recording medium. More particularly, the present invention relates to an improvement in a lining member attached to the inner surface of the casing of the disk cartridge.

2. Discussion of Background

A floppy disk has widely been used as an exchangeable information storage medium which can be fitted to a magnetically recording and reproducing device and can be removed from it for storage or transportation in the same manner as a magnetic tape cassette and a disk pack. 8-inch and 5-inch floppy disks have been commonly used. For such floppy disks, a thin flexible jacket made of vinyl chloride is used as a casing to protect a magnetic disk. However, the mechanical strength of the jacket is too weak to provide sufficient protection to the magnetic disk. Further, since the jacket has windows to allow insertion of a magnetic head and to drive a magnetic disk, careful attention to prevent dust from being deposited thereon is needed in consideration of eliminating such drawback. 3.5-inch floppy disks have employed a construction as follows. Thick, hardly deformable, strong upper and lower half casings are combined to form a hard casing; a shutter is provided at a window to allow the insertion of a magnetic head, and a hub formed on a magnetic disk is placed to face the window for driving the magnetic disk so that the disk is held in the hard casing in a rotatable manner.

A lining member for effecting cleaning function to remove dust from the surface of the inner wall of each of the half casings is attached to the inner surface of the half casings so that the lining members are in contact with the magnetic disk held in the hard casing. The lining member generally has a single structure and is composed of a non-woven cloth of excellent smoothness and which is difficult to be charged. Also known is a lining member having a three-layered structure.

However, the lining member of a single structure has a low dust retaining function, so that dust or fine particles are apt to be deposited on the magnetic disk to thereby cause errors in recording or reproducing. In an attempt of improving the cleaning function, a frictional force of the lining member to the magnetic disk becomes large, whereby other problems of increase in torque and damage to a surface of the magnetic disk may take place.

In the lining member having a three-layered structure which allows use of both surfaces, a relatively large amount of a binder (an adhesive) has to be contained in the middle layer to thereby prevent fibers in the nonwoven cloth from being deposited on the disk. The later case still has the same problem as the former case.

SUMMARY OF THE INVENTION

It is therefore an object of the present invention to provide a disk cartridge having lining members by which a smooth rotation of a disk-like recording medium and excellent cleaning effect can be obtained.

The foregoing and other objects of the present invention have been attained by providing a disk cartridge which comprises upper and lower half casings to be assembled to form a hard casing, a magnetic disk held in the casing in a rotatable manner and lining members attached to the inner surfaces of the upper and lower half casings, wherein the lining member has a laminated structure comprising an attracting layer as a base layer capable of attracting dust and a smooth layer having a larger number of apertures which is laminated on at least one surface of the base layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
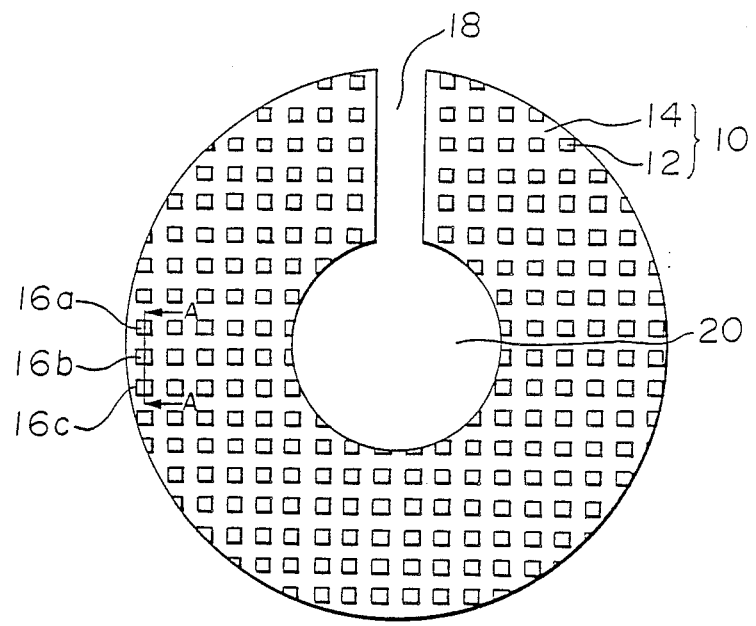
FIG. 1 is a front view of an embodiment of the upper lining member used for a disk cartridge according to the present invention.
Figure 2:
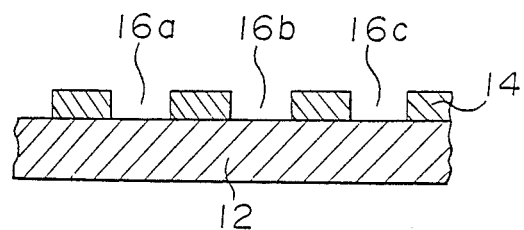
FIG. 2 is an enlarged cross-sectional view taken along a line A—A in FIG. 1.

Embodiments of the disk cartridge according to the present invention will now be described with reference to the drawings. FIG. 1 is a front view of an embodiment of the upper lining member and FIG. 2 is an enlarged cross-sectional view taken along a line A—A in FIG. 1, wherein reference numeral 10 designates a ring-shaped upper lining member. The upper lining member 10 has a laminated structure comprising an attracting layer 12 as a base layer capable of attracting dust or fine particles and a smooth layer 14 having a net-like structure which faces a magnetic disk. The attracting layer 12 is made of a material which is easily charged, such as polyester fibers. The smooth layer 14 is made of a material having good smoothness such as a material including carbon fibers. By disposing the upper lining member so that the smooth layer 14 having a net-like structure faces the magnetic disk, the smooth layer 14 is in contact with the magnetic disk so that the surface of the attracting layer 12 is partially exposed through a large number of apertures 16 (16a, 16b, 16c) formed in the net-like structure formed of rows and columns of spaced apart smooth layers 14.

In FIG. 1, reference numeral 18 is an opening which corresponds to a window for insertion of the magnetic head and numeral 20 designates an opening which corresponds to a window for driving the magnetic disk.

The disk cartridge with the lining members according to the present invention is assembled as follows.

Figure 3:
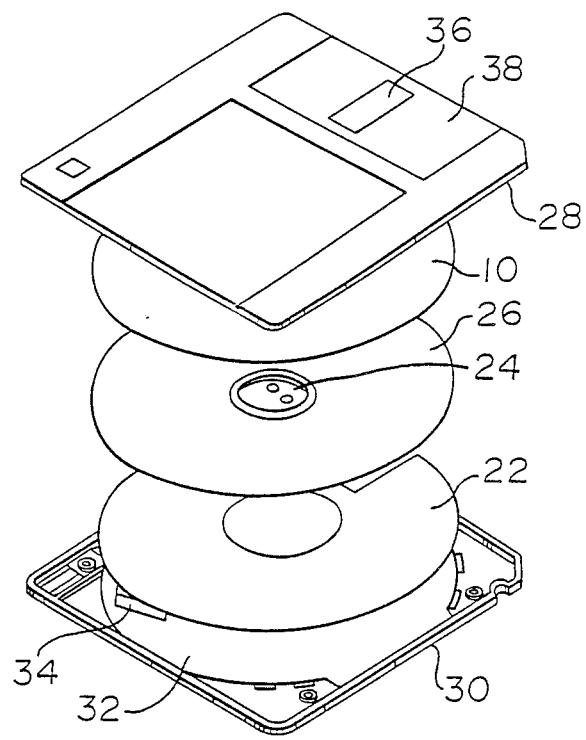
FIG. 3 is a perspective view in a disassembled state of a cartridge.

In an embodiment as shown in FIG. 3, a pair of upper and lower lining members 10, 22 are used. First, the upper and lower lining members 10, 22 are so arranged as to interpose a magnetic disk 26 with a central hub 24 between them, and this assembly is put between the upper and lower half casings 28, 30. When the assembly is put in the upper and lower half casings, the peripheral portion of each of the upper and lower lining members 10, 22 are respectively bonded to the inner surfaces 32 of the upper and lower half casings 28, 30. In this case, the bonding of the upper and lower lining members 10, 22 should not be carried out at the areas corresponding to lifter 34 provided in the lower half casing 30 and a projection for receiving the lifter formed in the upper half casing 28 so as to correspond the lifter 34, and around the lifter 34 and the projection. In FIG. 3, a reference numeral 36 designates a window for insertion of the magnetic head, which is formed in the upper half casing 28, and a numeral 38 designates an area to allow a sliding movement of the shutter, which is also formed in the upper half casing 28.

Figure 4:
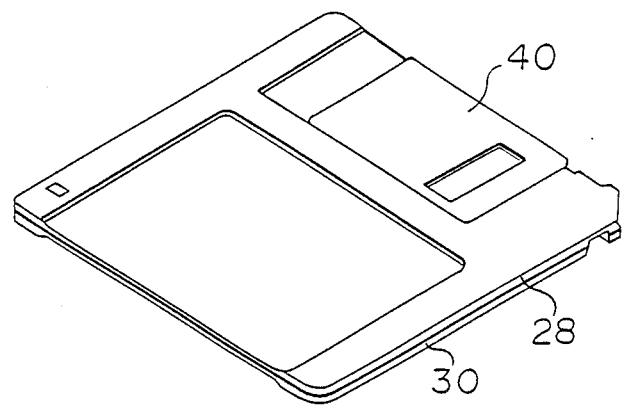
FIG. 4 is a perspective view of the disk cartridge in an assembled state.

FIG. 4 is a perspective view showing an outer configuration of the disk cartridge with a shutter in an assembled state. In an unused state of the disk cartridge, the shutter 40 closes the magnetic head insertion windows 36 formed in the upper and lower half casing 28, 30. Even under such condition, the disk cartridge is held inside the magnetic disk 26 in a rotatable manner. When the disk cartridge is mounted on a driving unit (a magnetically recording reproducing device) in order to use it, the shutter 40 is opened to allow insertion of the magnetic head through the windows 36 so that the head comes to contact with the surface of the magnetic disk 26 rotated by a driving force on to the hub 24 of the disk. In this case, each of the smooth layers 14 of the upper and lower lining members 10, 22 is in contact with the rotating magnetic disk 26. However, the smooth layers 14 are made of a material having good smoothness such that the frictional force is small and the magnetic disk 26 can be rotated smoothly. Further, since the smooth layers 14 have a net-like structure so that the surface of the attracting layer 12 is partially exposed through the large number of apertures 16 in the net-like structure, dust invading between the lining members and the magnetic disk can be efficiently attracted and retained by the attracting layers 12. More particularly, the lower lining member 22 is pushed up by the resilient force of those lifter 34 at the portions corresponding to the lifter 34 and around those portions. On the other hand, the upper lining member 10 is pressed down. Accordingly, the upper and lower lining members 10, 22 are forced to come in contact with the magnetic disk 26 with a high density at these portions whereby the dust removing function is further increased.

Figure 5:
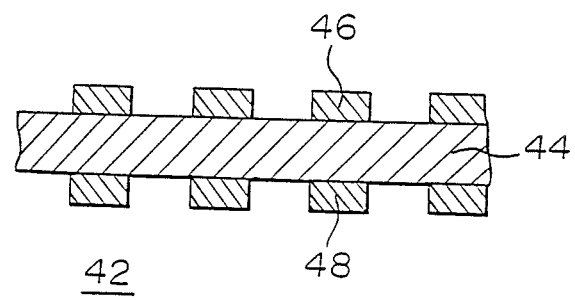
FIG. 5 is an enlarged cross-sectional view of another embodiment of the lining member used for a disk cartridge according to the present invention.

FIG. 5 is an enlarged partial cross-sectional view of another embodiment of the lining member used for a disk cartridge. In comparing of a lining member 42 according to the embodiment of FIG. 5 with the upper lining member 10 as in FIG. 2, the following difference is found. Namely, in the FIG. 2 embodiment, a laminated structure is formed by attaching the smooth layer 14 having a net-like structure to the attracting layer 12 at only side which faces the magnetic disk 26. On the other hand, in the FIG. 5 embodiment, a laminated structure is formed by attaching smooth layers 46, 48 with a net-like structure to both surfaces of an attracting layer 44 as a base layer, which is capable of attracting dust. Accordingly, in this embodiment, it is possible to use either of the smooth layers 46 and 48 of the lining member 42 to the magnetic disk 26, whereby assembling work can be easy.

The present invention is not limited to a disk cartridge for receiving a magnetic disk, but can be applied to a disk cartridge for receiving another disk-like recording medium.

Thus, in accordance with the present invention, smooth rotation of a disk recording medium is obtainable because the smooth layers 14 of the lining members are in contact with the medium. Further, excellent cleaning function is obtainable because dust is attracted to the attracting layers exposed through a large number of apertures formed in the smooth layers 14.

Obviously, numerous modifications and variations of the present invention are possible in light of the above teachings. It is therefore to be understood that within the scope of the appended claims, the invention may be practiced otherwise than as specifically described herein.

What is claimed is:

1. A disk cartridge which comprises:
   upper and lower half casings assembled to form a hard casing for holding a magnetic disk in the casing in a rotatable manner; and
   lining members attached to inner surfaces of the upper and lower half casings, wherein one of said lining members has a laminated structure which comprises an attracting chargeable base layer for attracting dust and a net-like smooth layer and which includes rows and columns of spaced apart individual smooth layer members having a large number of apertures, which are laminated on at least one surface of the base layer.

2. The disk cartridge according to claim 1, wherein the smooth layer of said one of said lining members faces the magnetic disk.

3. The disk cartridge according to claim 1, wherein the attracting layer comprises a chargeable material.

4. The disk cartridge according to claim 1, wherein the attracting layer comprises polyester fibers.

5. The disk cartridge according to claim 1, wherein the smooth layer has a plurality of apertures formed therein and the attracting layer is positioned on said cartridge opposite a side of the magnetic disk.

* * * * *